United States Patent [19]

Guimond et al.

[11] 4,359,509

[45] Nov. 16, 1982

[54] TUBULAR POSITIVE ELECTRODE MEANS FOR USE IN LEAD-ACID STORAGE BATTERIES INCLUDING SHAPED GRID STRUCTURE AND SELF-REGISTERING GRID COMPLEMENT MEANS THEREFOR

[75] Inventors: Roy A. Guimond, Holden; John E. Gulliksen, Shrewsbury; Nanci W. Reed, Sudbury, all of Mass.

[73] Assignee: Koehler Manufacturing Company, Marlborough, Mass.

[21] Appl. No.: 239,159

[22] Filed: Feb. 27, 1981

[51] Int. Cl.³ ............................................. H01M 2/18
[52] U.S. Cl. ................................... 429/140; 429/234; 429/238
[58] Field of Search ................. 429/140, 234, 233, 238

[56] References Cited

U.S. PATENT DOCUMENTS

| 3,083,250 | 3/1963 | Geissbauer | 429/234 X |
| 3,170,823 | 2/1965 | Geissbauer | 429/234 X |
| 3,247,023 | 4/1966 | Geissbauer | 429/234 X |
| 4,011,370 | 3/1977 | Eckerbom | 429/238 X |
| 4,202,936 | 5/1980 | Guimond et al. | 429/234 X |

*Primary Examiner*—Charles F. LeFevour
*Attorney, Agent, or Firm*—Hamilton, Brook, Smith & Reynolds

[57] ABSTRACT

Improved positive electrode means for use in a lead-acid battery includes a shaped grid structure, a self-registering plastic grid complement member selectively overlying portions of the shaped grid structure, tube means engaged around depending portions of the grid complement member and active material confined within the tube means. Assembly of these constituent parts is characterized by a first insertion of the shaped grid structure into the grid complement member thereby to produce an angular displacement of self-registering side portions of the grid complement member; further advancement of the shaped grid structure into the grid complement member enables the angularly displaced side portions of the grid complement to revert to their normal position in self-registering relationship to the grid structure.

8 Claims, 16 Drawing Figures

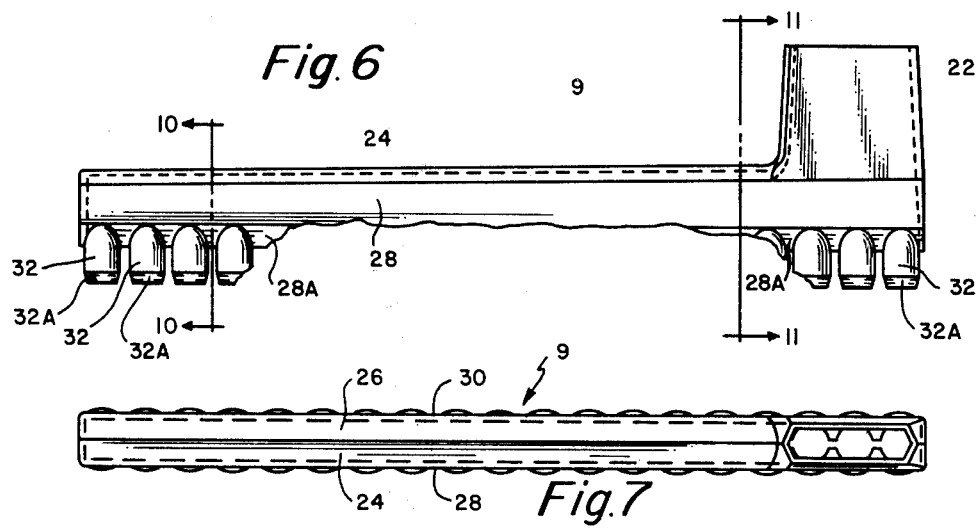
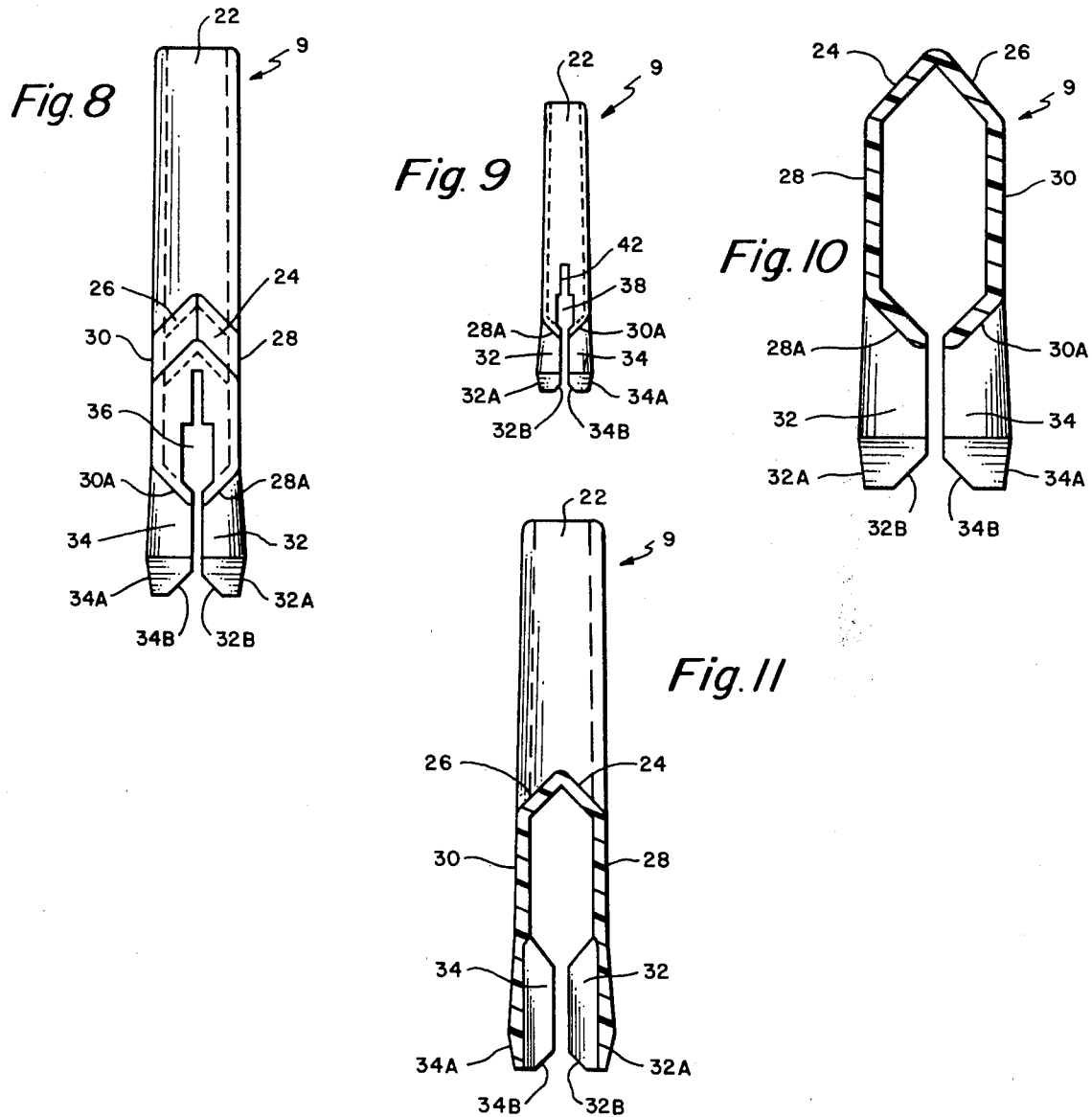

TUBULAR POSITIVE ELECTRODE MEANS FOR USE IN LEAD-ACID STORAGE BATTERIES INCLUDING SHAPED GRID STRUCTURE AND SELF-REGISTERING GRID COMPLEMENT MEANS THEREFOR

FIELD OF THE INVENTION

Lead-acid batteries of a tubular construction as used, for example, in motive power or stationary applications and as presently manufactured, include positive and negative electrodes, separator means and electrolyte contained in cell body means. Each positive electrode is constructed with a grid structure having a top bar, a lug and spaced apart spines, and with tube means containing active material located around the spines.

Grid structures of such positive electrodes are customarily cast from an antimony-bearing lead alloy. During the operation of a battery whose positive grid structures are formed from such an antimony-bearing lead alloy, antimony may migrate from exposed surfaces of the grid structures to the active material of the negative electrodes, thereby changing charging characteristics, increasing self-discharge rates, and increasing gassing rates with a resulting increased maintenance requirement. In addition, electrical current may flow directly between exposed surfaces of the positive grid and the negative electrodes, thereby lowering charging efficiency.

Efforts have been made to eliminate these problems by using antimony-free lead alloys in the positive grid structure. Use of such antimony-free alloys has largely been unsuccessful in the applications mentioned. For example, use of such alloys in batteries made for deep cycling may result in the formation of barrier layers of $PbSO_4$ around the spines, thus interrupting the electrical conductivity between the active material and the spines. It is therefore desirable to include antimony in a positive grid structure but to inhibit its migration from exposed portions of the positive grid surfaces to the negative electrode.

SUMMARY OF THE INVENTION

This invention relates to improved positive electrodes for use in tubular lead-acid storage batteries and, in particular, to such electrodes wherein antimony-bearing lead alloys may be utilized and protectively contained to restrict migration of antimony.

It is a chief object of the invention to provide an improved positive electrode construction characterized by specially formed grid structures and grid complement means designed to combine with one another in a desirable manner.

Another object is to provide an improved method of assembling grid component means on grid structures wherein the grid complement is characterized by the inclusion of portions which are selectively self-registering with parts of the grid structure.

Another object is to provide a grid complement and grid means constructed and arranged to receive and hold tubular bodies in partially distended positions in spaced relation to the grid spines.

These objects may be realized in accordance with the invention by providing shaped grid surfaces and grid complement means for fitting therewith in self-registering relation and characterized by angularly displaceable side wall portions which may be located within electrode tubes in spaced relation to the grid spines.

BRIEF DESCRIPTION OF THE DRAWINGS

FIG. 6 is a side elevational view, partially broken away, of a self-registering grid complement means of the invention.

FIG. 7 is a plan view of the grid complement means of FIG. 6.

FIG. 8 is an enlarged end elevational view of the grid complement means of FIG. 6.

FIG. 9 is an end elevational view of an opposite extremity of the grid complement means of FIG. 6.

FIG. 10 is a cross-section taken on the line 10—10 of FIG. 6.

FIG. 11 is a cross-section taken on the line 11—11 of FIG. 6.

DETAILED DESCRIPTION OF THE INVENTION

Figure 1:
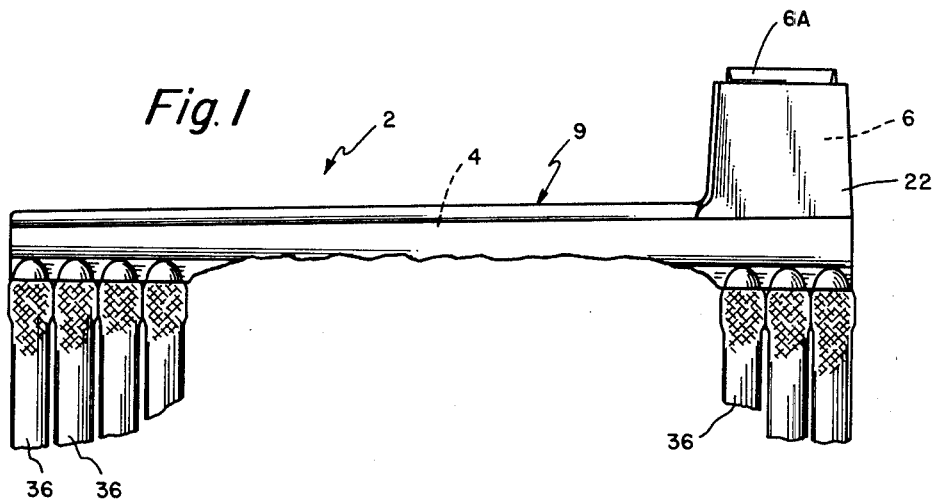
FIG. 1 is a side elevation, partially broken away, of an electrode means of the invention.
Figure 2:
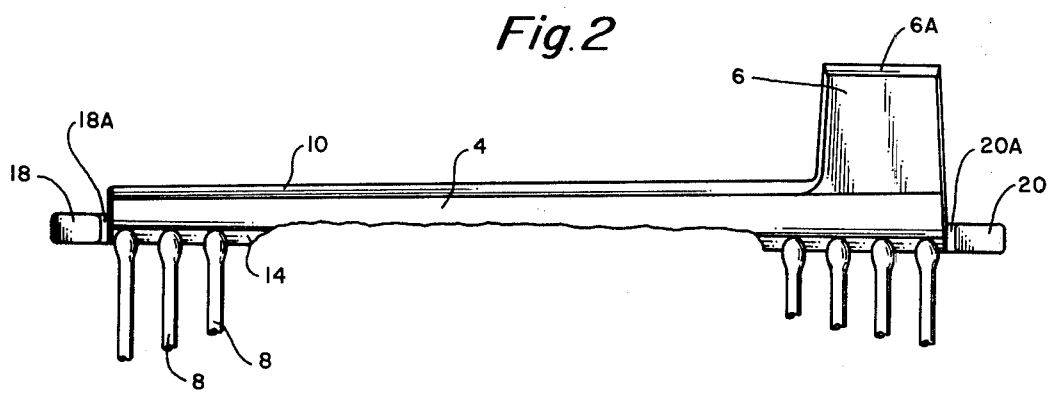
FIG. 2 is a side elevational view, partially broken away, of a shaped grid structure of the invention.
Figure 3:
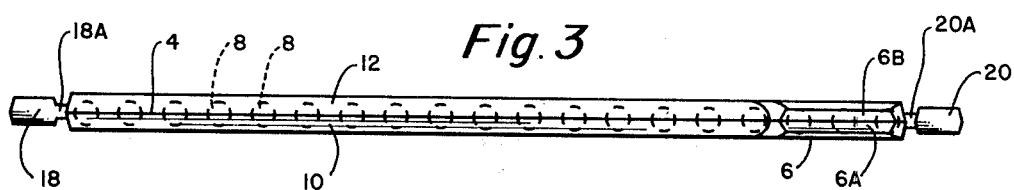
FIG. 3 is a plan view of the grid structure of FIG. 2.
Figure 4:
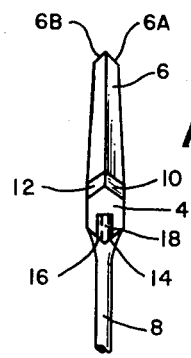
FIG. 4 is an end elevational view of the grid structure of FIG. 2.
Figure 5:
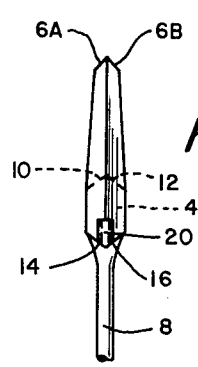
FIG. 5 is an end elevational view of an opposite end of the grid structure of FIG. 2.

In general, FIG. 1 illustrates a positive electrode of the invention. FIGS. 2-5, inclusive, illustrate details of a positive grid structure of the invention. FIGS. 6-11 illustrate details of a plastic grid complement member of the invention. FIGS. 12-16 illustrate a method of assembly and details of construction.

Referring in more detail to the invention structure, FIG. 1 shows a positive electrode of the invention generally denoted by the arrow 2. The electrode includes a grid structure consisting of a top bar 4, a lug 6 and spaced apart depending spines as 8, more clearly shown in FIG. 2. The electrode structure also includes a self-registering grid complement member, generally denoted by arrow 9, and a plurality of tubes as 36 containing active material.

The grid structure is more clearly shown in FIGS. 2-5 wherein the grid parts 4, 6, and 8 as noted above are indicated. The top bar 4 is constructed with shaped surfaces 10, 12, 14 and 16 of predetermined form which provide converging flat surfaces at top and bottom of the top bar as shown. Ends of top bar 4 may be provided with breakaway disposable hanger parts 18 and 20 which utilized as hereinafter disclosed.

In accordance with the invention the grid structure, with its predetermined shaped surfaces, includes shaped lug portions denoted by 6A and 6B, at an opposite side of the top bar, spaced apart spines as 8. These spines are characterized by cross-sectional areas which increase as they merge with the top bar. These increased cross-sectional areas provide an increased current carrying mass of lead and also improve the corrosion resistance of the spines at these portions.

Considering in further detail the plastic grid complement structure 9, as shown in FIGS. 6-11, it will be noted that this grid complement structure 9 includes a lug enclosure portion 22, a top bar enclosure portion which is formed with upper shaped surfaces 24 and 26 of a predetermined converging angular configuration, and with self-registering similarly angled lower surfaces 28A and 30A which meet with angularly displaceable side portions 28 and 30. By means of these surfaces 28A and 30, when reverting to a normally undisplaced position, become firmly engaged about the top bar 4 against portions as 14 and 16 of the top bar lying between the spines. In addition, the side walls 28 and 30 are extended to provide a plurality of opposing spaced apart tube retaining portions as 32 and 34 presenting tapered extremities as 32A and 34A, respectively, and which are formed with inner diverging surfaces as 32B and 34B for facilitating grid insertion.

At opposite ends of the grid complement, as most clearly shown in FIGS. 8 and 9, are provided holes denoted by numerals 36 and 38 in which may be received disposable grid hanger portions 18 and 20 of the grid structure, respectively. A feature of this arrangement is that these holes 36, 38 may be conveniently extended to form slits 40 and 42 which are operative to facilitate angular displacement of the side wall portions 28 and 30 in the manner suggested in FIG. 12.

Figure 12:
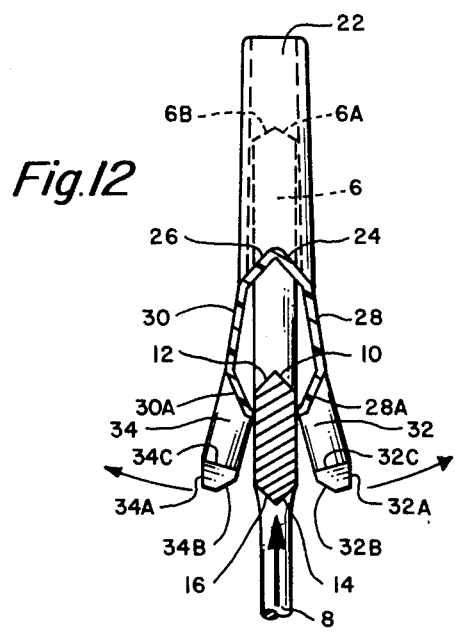
FIG. 12 is a cross-sectional view of the grid complement and grid structure illustrating a step in the assembly of these parts.
Figure 13:
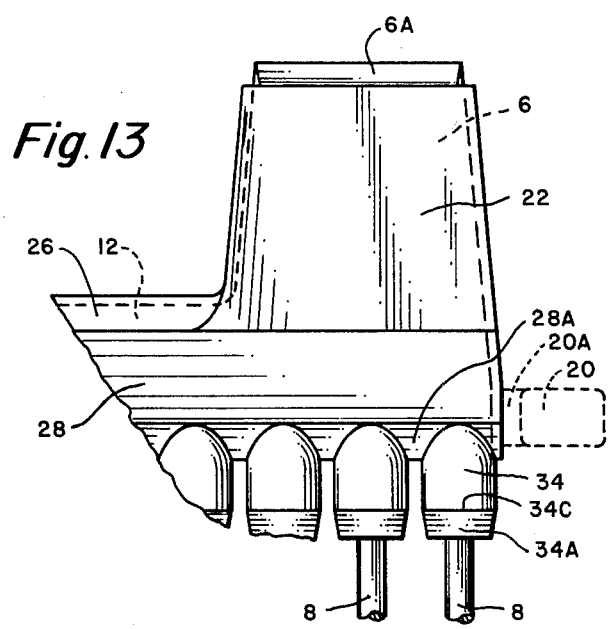
FIG. 13 is a fragmentary detail elevational view of a portion of a fully assembled grid and grid complement assembly of the invention.

FIG. 12 illustrates in part the method of assembly of the grid complement structure of the invention on the grid structure with its shaped surfaces. A first step (not shown) consists of inserting the top of the lug portion 6 between inner diverging surfaces 32B and 34B of the grid complement member. Further insertion of the grid is carried out such that lug 6 starts to enter lug enclosure 22. This further insertion brings surfaces 10 and 12 of the top bar 4 into contact with inner angularly diverging surfaces 32B and 34B of the grid complement member.

Still further advancement will cause outward angular displacement of said side wall portions 28 and 30 along the entire length of the grid complement member. When final advancement is achieved, such that the upper shaped portions of the top bar become engaged against shaped portions 24 and 26 of the grid complement, displaceable side wall portions 28 and 30 revert to their normal position. Thus, self-registering surfaces 28A and 30A of the grid complement become seated against surfaces 14, 16 of the top bar.

Figure 15:
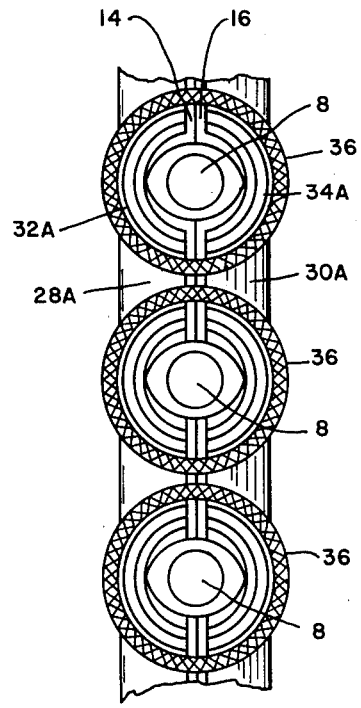
FIG. 15 is a fragmentary bottom view of an assembly comprising grid structure, grid complement means and tubes associated therewith.
Figure 16:
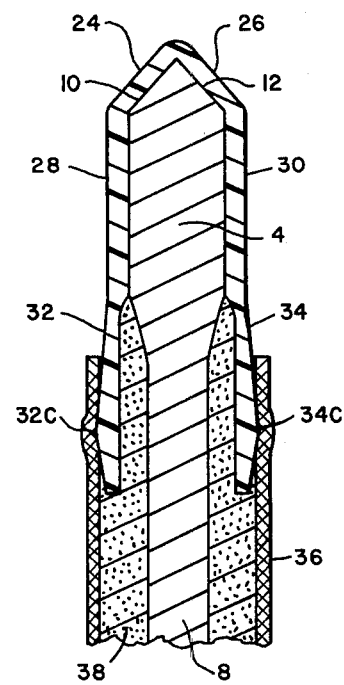
FIG. 16 is a cross-sectional view of a portion of the electrode means of the invention including active material.

FIGS. 1, 15 and 16 illustrate tubes as 36 in a fully assembled position on the grid complement. The steps which may be carried out in achieving this assembled position include (1) engagement of upper ends of tubes over tapered extremities 32A and 34A of the grid complement, (2) advancement of the tubes over the tube retaining parts 32 and 34 until the tube tops contact lower ends of surfaces 28A and 30A of the grid complement.

It is pointed out that, in this fully advanced position, upper ends of the tubes are maintained in a distended state by expansion forces exerted by edges 32C, 34C of the spine engaging parts as suggested in FIG. 16. Also illustrated diagrammatically in FIG. 16 is active material 38 included within the tubes 36 and extending into the space between tube engaging parts 32 and 34 and around the spines 8.

It is also pointed out that, by the arrangement of parts disclosed, the said active material may occur in a space which extends above the engaged portions of the tubes, and that this active material is confined by the tube engaging parts 32 and 34 of the grid complement, upper portions of the spines 8 and the top bar 4.

Figure 14:
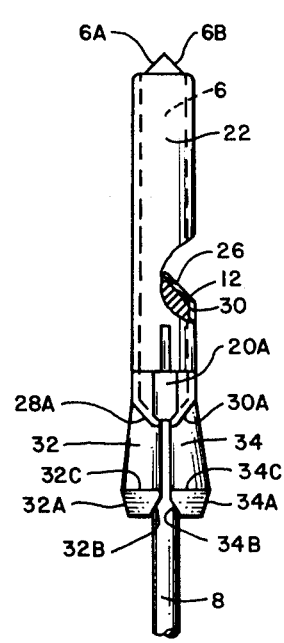
FIG. 14 is an end elevational view of the structure of FIG. 13, partially broken away, to show additional portions of the grid and grid complement means of the invention.

As earlier pointed out, the grid structure may include at opposite ends thereof, breakaway hanger portions 18 and 20 which are received in holes 36 and 38, respectively, of the grid complement member. During electrochemical formation of the electrodes these hanger portions are utilized to (1) provide mechanical support for the electrodes in an electrolyte bath and (2) provide a path for electrical flow of current to the grid structure of the electrodes. After electrochemical formation these portions 18 and 20 may be broken off and discarded. It is pointed out, however, that thinned portions 18A and 20A may remain on the grid structure protruding through respective holes 36 and 38 in the ends of the grid complement, as shown in FIG. 14. The eutectic values of an antimony-bearing alloy is such that antimony will tend to be concentrated at surface areas of a casting molded from such an alloy, and therefore the antimony content of the thinned portions 18A and 20A remaining will not be objectionable.

When a plurality of positive electrodes of the invention are to be interconnected with one another in a single cell body electrical interconnection may be made with a lead bridge extending between upper exposed portions of lugs as 6. This lead bridge should be fabricated from an antimony-free lead alloy.

I claim:

1. Improved tubular positive electrode means for use in a lead-acid storage battery, said electrode means including a grid structure consisting of a top bar, a lug portion extending from one side thereof, and spaced apart spine portions extending outwardly from an opposite side thereof, said top bar presenting shaped spaced apart surfaces of a predetermined configuration, a plastic grid complement member for selectively enclosing portions of the said grid structure, said grid complement being formed with spaced apart angularly displaceable side portions which are selectively self-registering with the predetermined shaped surfaces of the grid structure when these components are in assembled relationship with one another.

2. The invention of claim 1 in which the grid complement means includes a grid top bar enclosure portion and a lug enclosure portion, and the spaced apart angularly displaceable side portions are formed integrally with the top bar enclosure portion.

3. The invention of claim 2 in which the angularly displaceable side portions present spaced apart sections which are selectively self-registering with those portions of the top bar which lie between the said spines.

4. The invention of claim 1 in which the electrode means includes tubes having active material received therein and the spaced apart angularly displaceable side portions are extended to present a plurality of spaced apart tube engaging portions.

5. The invention of claim 4 in which the tube engaging parts are received within the tubes and maintain the tubes with their tops in a distended state.

6. The invention of claim 1 in which the electrode means includes tubes having active material received therein, said side portions in the selectively registered position extending inside the tubes for an appreciable distance to provide tube engaging surfaces which distend the tube tops, the space defined by the said side portions in their registered position exceeding in size the enclosed portion of the spines and active material received in the space lying between the said side portions and the respective spine portions.

7. The invention of claim 6 in which the said space contains active material in a position to engage with the top bar and spines at points above the engaged portions of the tubes.

8. The invention of claim 1 in which the spine portions are tapered to provide cross-sectional areas which increase as they merge with the said shaped surfaces of the top bar, thereby to provide an increased current carrying mass and improved resistance to corrosion.

* * * * *